United States Patent
Dwyer et al.

[11] Patent Number: 6,107,953
[45] Date of Patent: Aug. 22, 2000

[54] MINIMUM-GRADIENT-PATH PHASE UNWRAPPING

[75] Inventors: J. Craig Dwyer, Ann Arbor; C. L. Arnold, Jr., Saline, both of Mich.; Kenneth W. Parker, Nazareth, Pa.

[73] Assignee: Veridian ERIM International, Inc., Ann Arbor, Mich.

[21] Appl. No.: 09/265,448

[22] Filed: Mar. 10, 1999

[51] Int. Cl.[7] .................................................. G01S 13/90
[52] U.S. Cl. ........................... 342/25; 342/175; 342/176; 342/179; 342/190; 342/191; 342/195; 382/254; 382/276
[58] Field of Search ............................. 342/25, 159, 175, 342/176, 179, 180, 181, 189–197; 324/300, 307, 309; 382/100, 162, 254, 276, 278, 280, 325

[56] References Cited

U.S. PATENT DOCUMENTS

| | | | |
|---|---|---|---|
| 4,975,704 | 12/1990 | Gabriel et al. | 342/25 |
| 5,260,708 | 11/1993 | Auterman | 342/25 |
| 5,424,743 | 6/1995 | Ghiglia et al. | 342/25 |
| 5,432,447 | 7/1995 | Song | 324/309 |
| 5,608,405 | 3/1997 | Pritt | 342/25 |
| 5,659,318 | 8/1997 | Madsen et al. | 342/25 |
| 5,726,656 | 3/1998 | Frankot | 342/25 |
| 5,835,055 | 11/1998 | Van Der Kooij | 342/25 |
| 5,923,278 | 7/1999 | Poehler et al. | 342/25 |
| 5,923,279 | 7/1999 | Bamler et al. | 342/25 |

OTHER PUBLICATIONS

"IBM Tech. Discl. Bull.," (vol. 37, No. 3; pp. 441–442; Mar. 1, 1994); "Algorithm for Two–Dimensional Phase Unwrapping Using Fast Fourier Transforms".

*Primary Examiner*—Bernarr E. Gregory
*Attorney, Agent, or Firm*—Gifford, Krass, Groh, Sprinkle, Anderson & Citkowski, PC

[57] ABSTRACT

A method of phase unwrapping is described along with an efficient UNIX/C implementation. From selected reference or starting points in a phase-wrapped image, the phase gradients with respect to the nearest neighbors of the starting pixels whose correlation is above the first correlation threshold are examined and a path representing the smallest phase difference is chosen as the first step in the creation of a path. The process is continued and, with each step, a maximum of three new neighbors is added to a list of possible path extensions. The list is sorted by step size, and the smallest step size is selected as the next path extension. This continues until all pixels that can be reached by paths containing only pixels with correlation above the first correlation threshold are on a path. In the same way, the paths are then extended to include all pixels with correlation above the next lower correlation threshold. The process is finished when the paths include all pixels reachable by a path that includes only pixels with correlation above the lowest correlation threshold.

5 Claims, 3 Drawing Sheets

; Example process file for the phase unwrapping system. Note that lines starting
; with a semi-colon are explanatory comments and are ignored by MGP.

; The output process parameters. If the image is not segmented, a segmentation file is
; not written.
output_prefix = cla-def
report_stack_statistics = NO
segment_image = YES ; Wrapped phase image file
wrapped_phase_file
[
  file_name = image_2.wrpPhase
  file_type = SIO
]

; Name of the correlation file
correlation_file
[
  file_name = image_2.cor
  file_type = SIO
]
filter_size = 16
sampling = 1

; Correlation thresholds. If num_cor_thresholds = 0, then 5 correlation thresholds are
; computed automatically as described above.
num_cor_thresholds = 3
cor_threshold = .6
cor_threshold = .4
cor_threshold = .01

; Element at which unwrapping begins
reference_line_offset = 209
reference_element_offset = 135

; The modulo value of the reference element. This value is in
; multiples of $2*\pi$ radians and must be an integer
reference_element_value = 13

; The gradient resolution. This parameter defines the resolution of
; the minimum gradient search and is expressed in radians. The valid
; range is from $\pi$ to 0.0001 radians. The value 0.02454 corresponds
; to 128 levels of resolution (128 bins in each stack).
gradient_resolution = .02454

Fig - 3

MINIMUM-GRADIENT-PATH PHASE UNWRAPPING

FIELD OF THE INVENTION

The present invention relates generally to electronic image formation and remote sensing and, more particularly, to a method of unwrapping the phase of an image to produce a continuous-phase function without artificially induced discontinuities.

BACKGROUND OF THE INVENTION

The need for phase unwrapping arises in several applications of coherent optics and radar. For example, phase unwrapping is one of the key requirements for terrain elevation mapping by a dual-antenna interferometric SAR (synthetic aperture radar) system. In an interferometric system, terrain elevation information is carried by the phase difference from a two-channel SAR. Initially, however, this phase is modulo-360 degrees, with discontinuities at the transition between zero and 360 degrees; that is, the phase is wrapped. The conversion to a continuous-phase function without an artificial maximum value at 360 degrees is called phase unwrapping.

Phase unwrapping is a challenging technological processing problem under realistic conditions. Various terrain conditions will ultimately cause any phase unwrapping algorithm to fail. For instance, terrains which have a low microwave reflectivity will have low signal-to-noise ratios, so that the phase will be noisy. And terrains which have large terrain gradients and/or discontinuities will cause corresponding large-phase gradients, discontinuities, and unwrapping errors in conjunction with even small amounts of noise.

The robustness of a phase unwrapping algorithm is defined by its ability to successfully unwrap these problematic kinds of data without significant errors. Two important features which characterize the robustness of a phase unwrapping algorithm are (1) its resistance to errors in the presence of noise, high gradients, and discontinuities and (2) "graceful degradation" of the output unwrapped phase in the presence of unwrapping errors. With regard to item (2), when an error occurs, ideally the algorithm recognizes that an error is likely at that point to isolate it and prevent it from propagating to other parts of the image. Isolation of errors not only limits the number of errors, but also makes it possible to remove the errors by post unwrapping filtering techniques.

SUMMARY OF THE INVENTION

The present invention resides in the process of unwrapping the phase of an image composed of horizontal and vertical pixels. From a selected reference or starting point in the image, the phase differences to the nearest neighbors of that pixel are examined, and the path representative of the smallest phase difference is chosen as the first step in the creation of a path subject to some auxiliary correlation constraints which are described in the Detailed Description of the Invention.

After the initial step, there will now be six neighbors adjoining the path but not yet in the path, three each for the two points already in the path. Of the six, the minimum step size which also satisfies the correlation constraints is selected. With each successive step, a maximum of three new neighbors (possible extensions to the existing path) must be added to a list of possible path extensions. The list is then sorted by step size, and the smallest step size is selected as the next path extension, and so on. The complexity of subsequent steps grows as the number of neighbors continues to grow, and we must keep track of neighbors already included versus new ones not yet in the path. The algorithm is finished when the path is extended to include all pixels.

The basic method is useful in a variety of applications in coherent optics and radar. For example, in a pixelized interferometric synthetic-aperture radar (SAR) image formation process wherein terrain elevation information is carried by the phase difference between two input channels at modulo-360-degrees, the method is operative to convert the elevation to a continuous-phase function without an artificial maximum value at 360 degrees.

BRIEF DESCRIPTION OF THE DRAWINGS

FIG. 3 is an example parameter file showing the inputs to the MGP software.

DETAILED DESCRIPTION OF THE INVENTION

Figure 1:
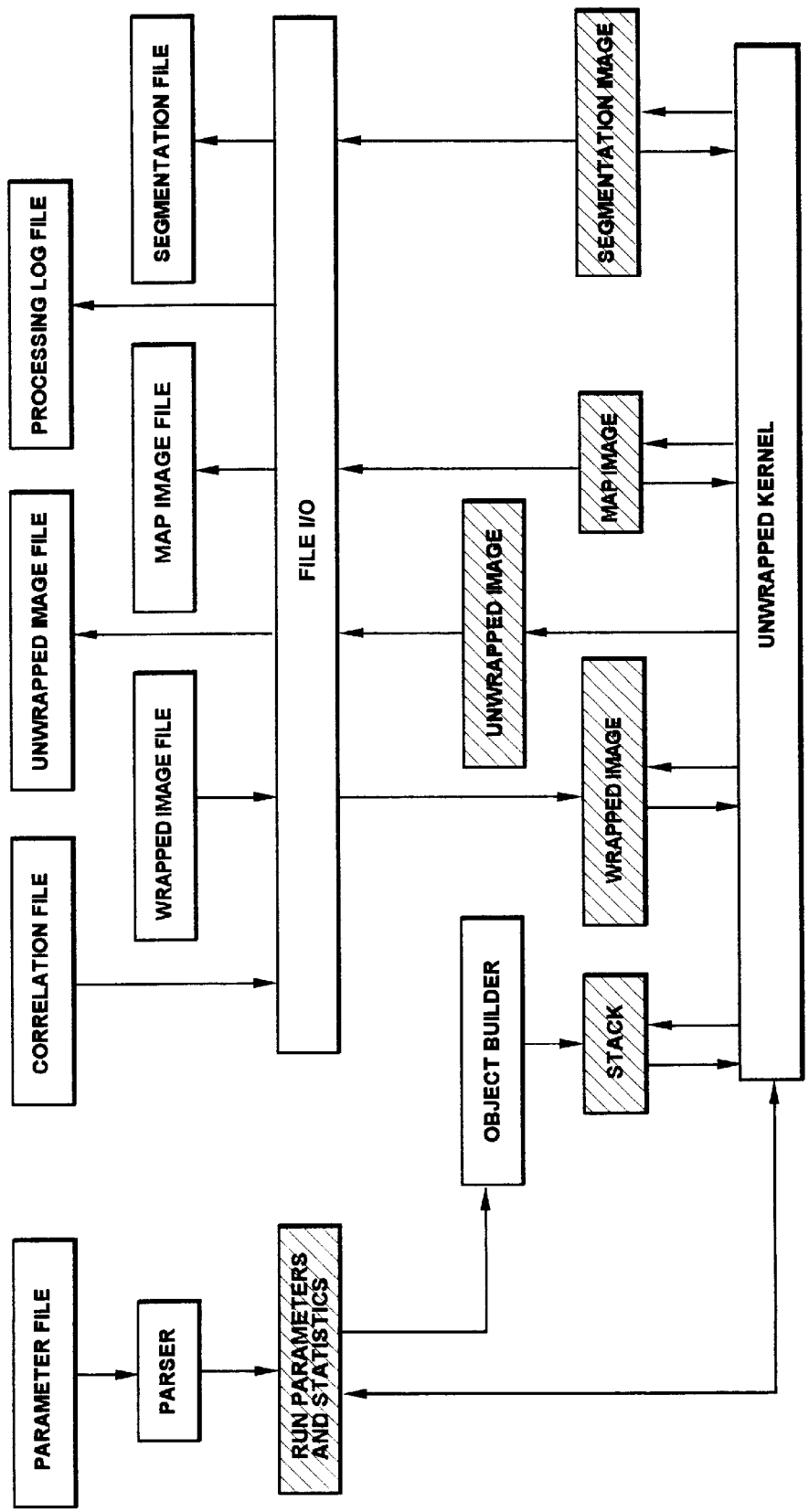
FIG. 1 is a block diagram of a UNIX/C hardware implementation of the invention.

By way of an introduction, a "path" is defined herein as a sequence of neighboring pixels within a 2-D image array. According to the invention, pixel-to-pixel phase differences are computed along some arbitrary two-dimensional path. The phase difference is a priori constrained to values less than ±180 degrees. The unwrapped phase is then the integrated phase difference along the path.

The instant invention fits within a class of possible algorithms for which a path quality metric is defined, after which a search is conducted to find a path of good or "optimum" quality for each and all pixels in the scene. This may be a very daunting task, as the number of possible paths from a given reference point to any other point in the image increases extremely rapidly with image size. Path quality need not be defined in an absolute sense, however, since only a relative comparison is needed among possible paths.

Along with a wrapped phase file, interferometric systems generally produce a correlation file. This is standard for interferometric SAR systems. This file is produced by running a correlation filter over the two channel complex images. The filter size is defined as the number of pixels used in the cross correlation. Thus a filter that cross correlated a three by three rectangle of pixels would have a size of 9. The cross correlation is a standard complex cross correlation and produces an output between 0 and 1 representing how similar the two channel images are to each other. Low noise, smoothly varying data produces a correlation near one while noisy or discontinuous data produces a correlation near zero.

For the MGP algorithm, path quality is defined to decrease with the maximum phase difference between any two neighboring pixels along the path, and also with decreasing correlation along the path. If we define a "step size" to be the phase difference between two neighboring pixels along a path, then we seek a path which has the smallest maximum step size among all possible paths to any given point. This is analogous to the statement that a chain (path) is only as good as its weakest link (largest step). Independent of phase gradient, a set of correlation thresholds are defined and used as constraints on the extension of the unwrapping path; i.e., the path is not extended to a point if that point has a correlation that is below the current threshold.

The unwrapping is done within correlation intervals defined by a set of correlation thresholds. All pixels above the first (highest) threshold are unwrapped first using the method described above. Then the pixels within the correlation interval between the first and second thresholds are unwrapped. This continues until all pixels above the last (lowest) correlation threshold have been unwrapped.

The first step in execution of the MGP Algorithm is trivial. From a selected reference or starting point in the image, there are four neighbors: up, down, right, or left. We compute the phase difference to these neighbors and then select the smallest that is in the first correlation interval as the first step in the creation of a path. After the first step, there will now be six neighbors adjoining the path but not yet in the path, 3 each for the 2 points already in the path. Of the six, we select the minimum step size in the first correlation interval for the next extension of the path.

With each successive step, a maximum of 3 new neighbors (possible extensions to the existing path) must be considered as possible path extensions. The possible path extensions must then be sorted by step size, and the smallest step size satisfying the correlation constraint is selected as the next path extension. The complexity of subsequent steps grows as the number of neighbors continues to grow and we must keep track of neighbors already included vs. new ones not yet in the path. The algorithm is finished with the highest correlation interval when the path is extended to include all pixels that can be reached by paths that include only pixels with correlation within the first correlation interval. The next correlation interval is then unwrapped. MGP is done when the unwrapping is completed for the lowest correlation interval. The result is one long meandering path with many dead ends and forks that connects each point in the image to the starting point.

For clarity, the above description and the following detailed description are for a single starting point. If the absolute phase is known for multiple points, this set of points can be used to start the MGP unwrapper with the same algorithm. Each of the multiple points will generate a path and the result will be a set of paths connecting each point in the image to one of the starting points.

The last operation is to segment the unwrapped image, if this operation is requested by the user. Segmentation uses multiple criteria to flag areas of the unwrapped image that probably did not unwrap properly.

An efficient workstation-based UNIX/C implementation for sorting and finding subsequent path extensions will now be described. The overall architecture of the Unix implementation is shown in the diagram in FIG. 1. In this diagram, boxes with a shadow represent files, unshadowed boxes represent the actual algorithm functionality software, and the shaded boxes represent data structures (memory structures created and/or changed during execution of the program.

The user creates a parameter file by entering certain information such as image file identification, size, and reference point location, correlation thresholds (discussed more later), etc. A sample parameter file is shown in FIG. 3. The software performs all remaining functions and outputs the unwrapped image as well as a copy of the processing file, including statistics on the algorithm execution, and a "segmentation image file" (explained later). For best unwrapping accuracy, we use 32 bit floating point values for the wrapped phase and correlation.

Correlation threshold constraints on the unwrapping path are automatically set for any given wrapped phase data set based on the probability that a pixel having some observed correlation is dominated by random noise. By restricting the path initially to only paths which have a low likelihood of being dominated by noise, occasional but catastrophic errors in the early stages of unwrapping are avoided. Specifically, several correlation thresholds, Cp, are set based on the equation:

$$Cp = Ap + Bp/sqrt(M/O^2)$$

where: p is the probability of a pixel which is dominated by noise having correlation above Cp; Cp is the correlation threshold corresponding to p as a function of the number of independent samples in the correlation filter ($M/O^2$); M is the size of the correlation filter (in pixels); $O^2$ is the two dimensional oversampling (pixels/resolution cell)$^2$; Ap and Bp are empirically determined parameters given in the table below.

| Value of p | $A_p$ | $B_p$ |
|---|---|---|
| 0.001 | 0.21 | 1.676 |
| 0.100 | 0.075 | 1.317 |
| 0.200 | 0.015 | 1.256 |
| 0.300 | 0.007 | 1.12 |
| 0.400 | 0.007 | 1.005 |
| 0.500 | −0.016 | 0.938 |
| 0.600 | −0.008 | 0.795 |
| 0.700 | −0.00036 | 0.691 |
| 0.800 | −0.0005 | 0.517 |

The equations for Ap, Bp, and Cp were derived on the basis of empirical fits to large numbers of Monte Carlo simulations. These equations for Cp allow MGP to calculate correlation thresholds based on a desired p and known $M/O^2$. Experience with real and simulated data has indicated that 5 correlation thresholds corresponding to the probabilities in the table below work well. Refinement of the number and levels of these thresholds could be made for a number of reasons such as different purposes or tuning them to a specific system or set of collected data.

| Correlation threshold number | Probability (p) that a pixel is dominated by noise |
|---|---|
| 1 | 0.001 |
| 2 | 0.100 |
| 3 | 0.200 |
| 4 | 0.500 |
| 5 | 0.800 |

The unwrapping proceeds along the minimum gradient path until all pixels above the first threshold are unwrapped. Then pixels above the second . . . fifth thresholds are unwrapped. Pixels with correlation below the lowest (fifth) threshold are not unwrapped.

The object builder analyzes the data and creates the temporary data structures for storing the input wrapped image, processing stacks, unwrapped image, and map image. The key operations of the algorithm are performed by the unwrapping kernel interacting with the (processing) stacks, and a map data structure. The map data structure keeps track of pixels in the current path vs. those which have not yet been unwrapped.

Figure 2:
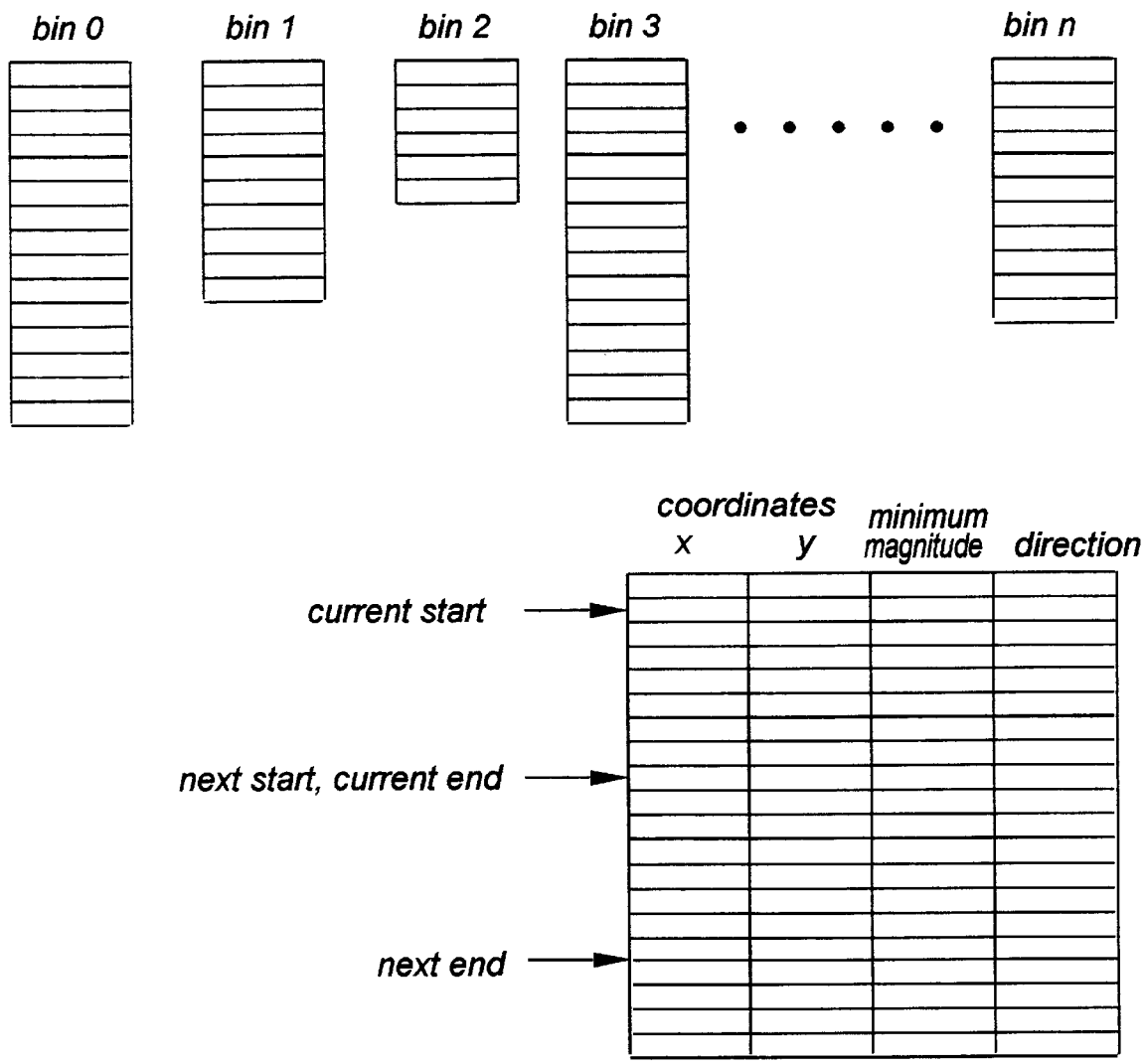
FIG. 2 illustrates the structure of a processing stack.

Two stacks are allocated, one is the working stack and the other is the save stack. The structure of the processing stacks are shown in FIG. 2. In order to eliminate constant re-ordering of a single stack of pixels, a user set number of bins are created and maintained, one for each quantized phase gradient. For example, if the user chose to have 128 bins all pixels in the current path which have neighbors with a phase difference less than 1.4 degrees (180/128) and which are not in the map image, would go into the first bin. Phase differences between 1.4 and 2.8 degrees go into the second bin, etc. Once pixels are placed into the proper bin, they are properly ordered "once and for all". That is, by using a set of quantized bins rather than a single priority list, there is no need to constantly reorder the list with the addition of new neighbor pixels. This procedure produces an enormous improvement in unwrapping speed.

The x, y coordinates stored in a given bin are not those of the best path neighbor, rather of points in the existing path together with pointers to the best path new neighbor. The direction field is composed of four bits indicating whether neighbors up, right, down, and/or left are to be unwrapped.

MGP starts by setting the current correlation threshold to the highest threshold. When a pixel is taken from the working stack, the pixel pointed to as the best next pixel in the path is unwrapped. When this pixel is unwrapped, its neighboring pixels are examined. If any of these neighbors are not in the map image they are possible extensions to the path. The possible extension with the smallest phase step that is also above the current correlation threshold is identified. The unwrapped pixel and the pointer to the best path extension (if any) are placed on the working stack. The pixel taken from the working stack is also examined and if another neighbor of this pixel is now a best path extension, this pixel and the pointer to its new path extension is also placed on the working stack. This same process is followed to find possible path extensions to pixels that are below the current correlation threshold. Pixels representing path extensions below the current correlation threshold are placed on the save stack but not unwrapped.

When the working stack is empty, all pixels that can be reached by paths containing only pixels above the current correlation threshold have been unwrapped. MGP then sets the current correlation threshold to the next lower threshold, interchanges the working and save stacks so that the save stack becomes the new working stack and the working stack becomes the new save stack. MGP then continues unwrapping. When the working stack has been emptied at the lowest threshold, MGP is done.

With the current definition of path quality, it does not matter which pixels from a given bin are unwrapped first. Pixels are unwrapped in the same order in which they get placed into the bin (i.e., first in, first out). However, pixels within a bin are given "current" and "next" designations. When a given non-empty bin, say x, is first looked at, all pixels present will have the "current" designation. Initially there will be no "next" designated pixels within that bin, nor any pixels in any prior bins (representing step sizes less than x). As pixels within the current list of bin x are unwrapped however, new neighbors are generated and distributed to the appropriate bins including, possibly, into bin zero or the "next" designated section of bin x. A pixel added to bin zero is not unwrapped or even looked at until all pixels in the "current" list of bin x have been removed however. This does not violate the definition of path quality, since any pixels added in this way to bin zero already have a previous step size of x in the path. Execution time is saved, since we do not look at all prior bins after each pixel is unwrapped, but only when a "current" list within a given bin is exhausted. If we always gave immediate priority to taking the smallest step size, the next pixel in the current list of bin x might eventually be unwrapped using an alternative path, each step of which might be smaller than x. This alternative path would be longer and, as mentioned above, the overall path would still have a step size of x, and hence be of the same quality by the original definition. Thus, the use of "current" and "next" designators within a given bin insures that path length is given some importance, but secondary to maximum step size in the definition of path quality.

After unwrapping the image is segmented. There are three hard and three soft criteria used to detect pixels that probably did not unwrap correctly. The pixel is flagged as probably bad if it fails any one of the hard criteria. The hard criteria are:

Layover—this criteria looks at the phase difference between neighboring pixels in the unwrapped image. If any difference is over 360 degrees, then a layover discontinuity is flagged.

Correlation too low—The pixel fails if its correlation is less than the lowest correlation threshold. This pixel was not unwrapped.

Irreconcilable differences—The phase difference between the pixel and its neighbors is computed. If the range of values is greater than 180 degrees, the pixel fails this criteria. This set of pixels will contain the pixels flagged by "Layover" above as well as other pixels.

The soft criteria provide evidence that a pixel was not correctly unwrapped. There are three soft criteria and a pixel must fail two of them to be flagged as bad. The three soft criteria are:

Local variance—If the variance calculated from the neighboring pixels unwrapped phase is greater than a threshold (based on image sampling), the pixel fails this criteria. The pixel is in a "noisy area."

Low correlation—If the pixels correlation is below the highest threshold, the pixel fails this criteria. The pixel may be noise.

Rate of correlation change—If the correlation difference between the pixel and its neighbors is above a threshold, the pixel fails this criteria.

What is claimed is:

1. A method of unwrapping the phase of an image, comprising the steps of:

a) providing a sensor to gather an image having horizontal and vertical pixels;

b) choosing one or more starting points with known absolute phase;

c) determining the phase gradient between the starting points and their four nearest horizontal and vertical neighbors;

d) beginning the creation of a path by choosing the nearest neighbor with correlation above the first threshold of a starting point associated with the minimum gradient, the result being a first link in a path having six nearest neighbors not yet in the path, three of the six neighbors being associated with the starting point, and the other three being new neighbors associated with the nearest neighbor chosen on the basis of minimum gradient;

e) storing all of the gradients associated with each neighbor in a memory device;

f) sorting the neighbors associated with the path using an efficient software algorithm, including those associated with the three new neighbors, as a function of phase gradient;

g) choosing the pixel among all of the neighbors of the path having correlation above a first probablistically defined threshold representing the minimum gradient, thereby forming the next link of a path, which will include up to three new nearest neighbors;

h) repeating steps e) to g) when the paths extend to include all of the pixels of the image that can be reached by paths that include only pixels above the first correlation threshold; and i) repeating steps e) through h) for each correlation threshold until all pixels reachable by a path including only pixels above the lowest correlation threshold have been unwrapped.

2. The method of claim 1, wherein the pixels form part of a radar image.

3. The method of claim 2, wherein the radar image is a synthetic-aperture radar image.

4. The method of claim 1, further including the step of:

identifying areas in the image of doubtful unwrapping and flagging them in a segmentation file.

5. In a pixelized interferometric synthetic-aperture radar image wherein terrain elevation information is carried by the phase difference between two input channels at modulo-360-degrees, a method of converting the phase to a continuous elevation function without an artificial discontinuity at 360 degrees, comprising the steps of:

a) choosing one or more starting points with known absolute phase;

b) determining the phase gradient between the starting points and their four nearest horizontal and vertical neighbors;

c) beginning the creation of a path by choosing the nearest neighbor with correlation above the first threshold of a starting point associated with the minimum gradient, the result being a first link in a path having six nearest neighbors not yet in the path, three of the six neighbors being associated with the starting point, and the other three being new neighbors associated with the nearest neighbor chosen on the basis of minimum gradient;

d) storing and sorting all of the gradients associated with each neighbor of the paths in an efficient software algorithm, including those associated with the three new neighbors, as a function of phase gradient;

e) choosing the pixel among all of the neighbors of the path having correlation above a first probablistically defined threshold representing the minimum gradient, thereby forming the next link of a path, which will include up to three new nearest neighbors; and f) repeating steps d) to e) when the paths extend to include all pixels of the image that can be reached by paths that include only pixels above the first correlation threshold; and g) repeating steps d) through f) for each correlation threshold until all pixels reachable by a path including only pixels above the lowest correlation threshold have been unwrapped.

* * * * *